(12) United States Patent
Yu et al.

(10) Patent No.: US 9,461,333 B2
(45) Date of Patent: *Oct. 4, 2016

(54) ELECTROLYTES FOR RECHARGEABLE LITHIUM BATTERY AND RECHARGEABLE LITHIUM BATTERY COMPRISING SAME

(71) Applicant: SAMSUNG SDI CO., LTD., Yongin-si, Gyeonggi-do (KR)

(72) Inventors: Jung-Yi Yu, Yongin-si (KR);
Woo-Cheol Shin, Yongin-si (KR);
Sang-IL Han, Yongin-si (KR);
Tae-Hyun Bae, Yongin-si (KR);
Myung-Hwan Jeong, Yongin-si (KR);
Sang-Geun Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 460 days.

This patent is subject to a terminal disclaimer.

(21) Appl. No.: 13/946,939

(22) Filed: Jul. 19, 2013

(65) Prior Publication Data

US 2014/0199599 A1   Jul. 17, 2014

(30) Foreign Application Priority Data

Jan. 16, 2013  (KR) .................. 10-2013-0005097

(51) Int. Cl.
| | |
|---|---|
| *H01M 10/0567* | (2010.01) |
| *H01M 10/052* | (2010.01) |
| *H01M 10/42* | (2006.01) |
| *H01M 10/0568* | (2010.01) |
| *H01M 10/0569* | (2010.01) |

(52) U.S. Cl.
CPC ....... *H01M 10/0567* (2013.01); *H01M 10/052* (2013.01); *H01M 10/4235* (2013.01); *H01M 10/0568* (2013.01); *H01M 10/0569* (2013.01); *Y02E 60/122* (2013.01)

(58) Field of Classification Search
CPC .................... H01M 10/4235; H01M 10/0567; H01M 10/0568; H01M 10/0569; H01M 10/052; Y02E 60/122
See application file for complete search history.

(56) References Cited

U.S. PATENT DOCUMENTS

| | | | |
|---|---|---|---|
| 6,495,293 B1 | 12/2002 | Arai et al. | |
| 8,524,401 B2* | 9/2013 | Lee | H01M 10/052 252/62.2 |
| 9,123,973 B2* | 9/2015 | Lee | H01M 10/0567 |
| 2011/0117443 A1* | 5/2011 | Lee | H01M 10/052 429/328 |
| 2012/0034533 A1 | 2/2012 | Hong et al. | |
| 2012/0164519 A1* | 6/2012 | Lee | H01M 10/0567 429/163 |

FOREIGN PATENT DOCUMENTS

| | | |
|---|---|---|
| KR | 10-2001-0030178 A | 4/2001 |
| KR | 10-2005-0041093 A | 5/2005 |
| KR | 10-2005-0083532 A | 8/2005 |
| KR | 10-2011-0005066 A | 1/2011 |

* cited by examiner

Primary Examiner — Laura Weiner
(74) Attorney, Agent, or Firm — Knobbe Martens Olson & Bear LLP

(57) ABSTRACT

Disclosed is an electrolyte for a rechargeable lithium battery including an organic solvent; a lithium salt; a flame retardant; and at least one acrylate compound having a fluorinated alkyl group. The electrolyte for a rechargeable battery may provide a rechargeable lithium battery having flame-retardant characteristics without decrease of cycle-life and battery performance.

16 Claims, 1 Drawing Sheet

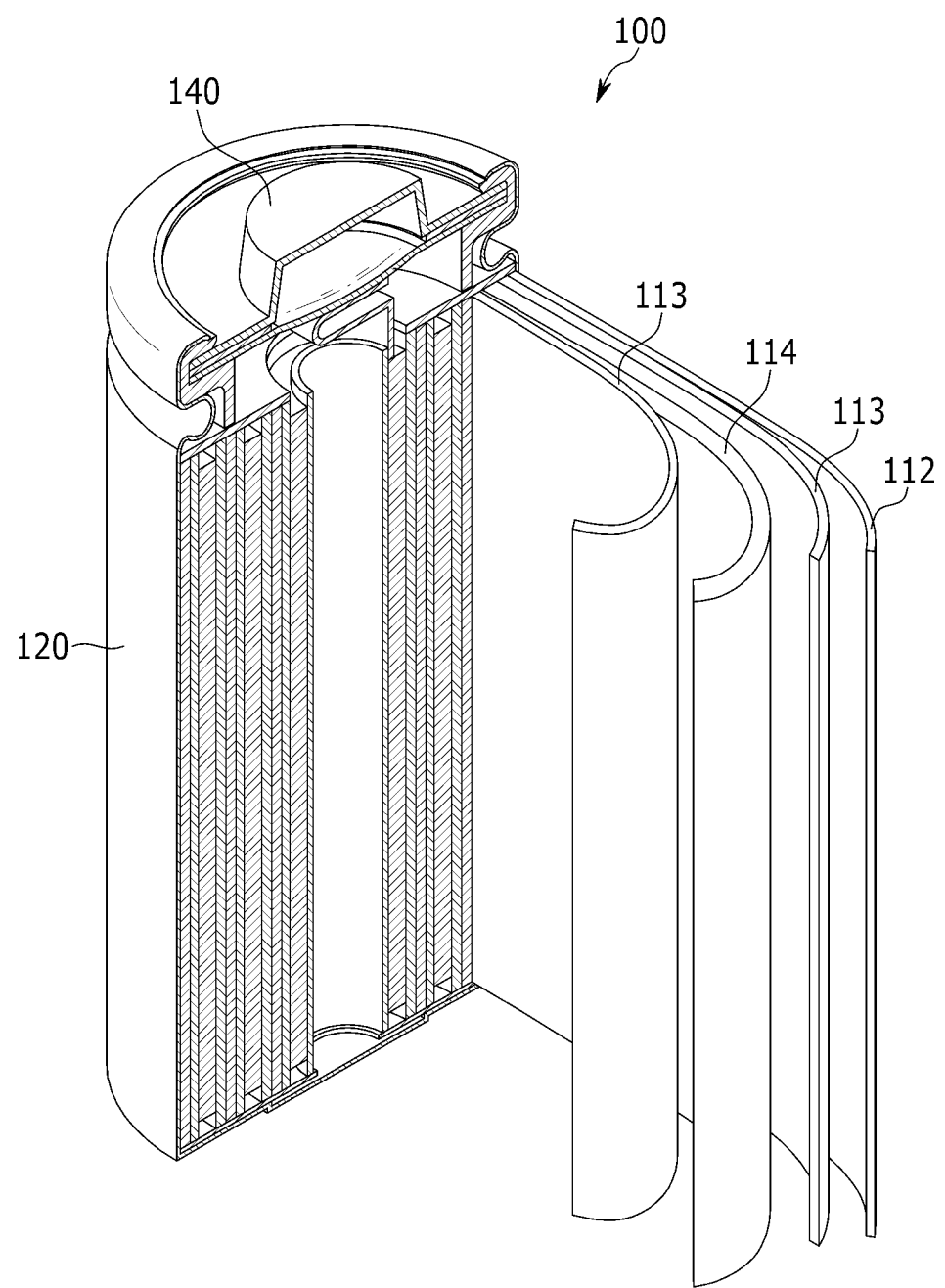

ELECTROLYTES FOR RECHARGEABLE LITHIUM BATTERY AND RECHARGEABLE LITHIUM BATTERY COMPRISING SAME

CROSS-REFERENCE TO RELATED APPLICATIONS

This application claims priority to and the benefit of Korean Patent Application No. 10-2013-0005097 filed in the Korean Intellectual Property Office on Jan. 16, 2013, the entire contents of which are incorporated herein by reference.

BACKGROUND

1. Field

An electrolyte for a rechargeable lithium battery and a rechargeable lithium battery including the same are disclosed.

2. Description of the Related Technology

Rechargeable lithium batteries capable of being repeatedly charged and discharged has a high voltage and a high energy density and excellent storage performance and operation performance at a low temperature and thus, are widely used as a power source for portable electronic devices.

Accordingly, rechargeable lithium batteries have been researched as being large-sized and applied to an electric vehicle or a domestic electricity storage device. However, rechargeable lithium batteries may be internally short-cut and even destroyed or exploded when they meet abnormal conditions such as overcharge and the like due to impurities therein or various reasons.

Accordingly, an electrolyte including a flame-retardant additive or an ionic liquid as an assistant solvent has been suggested to prevent these abnormal battery problems. However, the electrolyte has high stability but high viscosity and may deteriorate efficiency characteristic and decrease cycle-life characteristics of the rechargeable lithium battery.

Although the flame-retardant additive may have a stable electrochemical window, it is easily coordinated with lithium in the electrolyte and oxidized or reduction-decomposed on the interface which results in and the formation of a film and accordingly, increase interface resistance during the operation of the rechargeable lithium battery for a long period and deteriorate its cycle-life characteristics.

SUMMARY

One embodiment provides an electrolyte for a rechargeable lithium battery having improved flame-retardant characteristics and maintaining/improving battery characteristic.

Another embodiment provides a rechargeable lithium battery including the electrolyte.

According to one embodiment, an electrolyte for a rechargeable lithium battery includes an organic solvent; a lithium salt; a flame retardant; and an acrylate compound having a fluorinated alkyl group.

The organic solvent may include carbonate, ester, ether, ketone, alcohol, an aprotic solvent, or a combination thereof.

The lithium salt may be at least one selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$(LiBOB), and a combination thereof.

The flame retardant may include at least one selected from a phosphazene-based compound and a phosphoric acid ester-based compound.

The phosphazene compound may be represented by the following Chemical Formula 1:

[Chemical Formula 1]

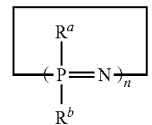

In the above Chemical Formula 1, n is an integer of 3 or 4, and $R^a$ and $R^b$ are the same or different and include, for example, F, $NR^1_2$, or $OR^1$, wherein $R^1$ is a $C_1$ to $C_{10}$ alkyl group.

In one embodiment, the phosphazene compound may be a compound represented by Chemical Formula 2a or Chemical Formula 2b:

[Chemical Formula 2a]

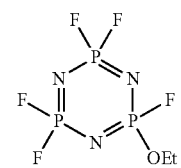

[Chemical Formula 2b]

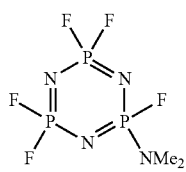

In one embodiment, the acrylate compound having a fluorinated alkyl group may be represented by Chemical Formula 3:

[Chemical Formula 3]

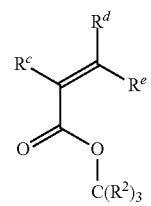

In the above Chemical Formula 3, $R^c$, $R^d$ and $R^e$ are the same or different and are hydrogen or a methyl group, $R^2$ are the same or different and are independently hydrogen or a $C_1$ to $C_{10}$ fluorinated alkyl group, provided at least one $R^2$ is a $C_1$ to $C_{10}$ fluorinated alkyl group. $R^2$ may include $-CF_3$, $-(CF_2)_nCHF_2$, $-(CF_2)_nCF_3$ (wherein, n is 1 to 5), $-CF_{2n}C_{2m}H_{2m+1}$ (n and m are 1 to 5), $-(CF_2)_nOC_{2m}F_{2m+1}$ (n and m are 1 to 5), $-(CF_2)_nOCF_2H$ (wherein, n is 1 to 5).

In one embodiment, the compound represented by the above Chemical Formula 3 may include hexafluoroisopropyl acrylate represented by the Chemical Formula 4, 2,2,3,3-tetrafluoropropyl acrylate represented by represented by the Chemical Formula 5, or a mixture thereof:

[Chemical Formula 4]

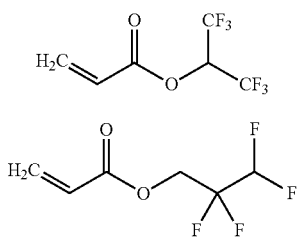

[Chemical Formula 5]

According to another embodiment, a rechargeable lithium battery including a positive electrode including a positive active material; a negative electrode including a negative active material; and the electrolyte is provided.

The present embodiments provide an electrolyte for a rechargeable lithium battery having no cycle-life deterioration at room temperature and improved battery properties such as resistance decrease and the like as well as flame-retardant characteristics.

BRIEF DESCRIPTION OF THE DRAWING

FIG. 1 is an exploded perspective view showing a rechargeable lithium battery according to one embodiment.

DETAILED DESCRIPTION

Example embodiments of the present disclosure will hereinafter be described in detail. However, these embodiments are only examples, and this disclosure is not limited thereto.

One embodiment provides an electrolyte for a rechargeable lithium battery including an organic solvent; a lithium salt; a flame retardant; and an acrylate compound having a fluorinated alkyl group.

The organic solvent may be a general solvent that is used in a lithium battery without limitation, for example, carbonates, esters, ethers, ketones, alcohols, or aprotic solvents. The carbonates as the organic solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. The esters as the organic solvent may include methyl acetate, ethyl acetate, n-propyl acetate, dimethylacetate, methylpropinonate, ethylpropinonate, γ-butyrolactone, decanolide, valerolactone, mevalonolactone, caprolactone, and the like. The ethers as the organic solvent may include dibutyl ether, tetraglyme, diglyme, dimethoxyethane, 2-methyltetrahydrofuran, tetrahydrofuran, and the like. The ketones as the organic solvent may include cyclohexanone, and the like. The alcohols as the organic solvent may include ethanol, isopropyl alcohol, and the like. The aprotic solvents as the organic solvent may include R—CN (wherein, R is a $C_2$ to $C_{20}$ linear, branched or cyclic hydrocarbon group and may include a double bond, an aromatic cycle, or an ether bond), amides such as dimethyl formamide, dioxolanes such as 1,3-dioxolane, sulforanes, and the like.

The organic solvent may be used singularly or in a mixture. When the organic solvent is used in a mixture, the mixture ratio can be controlled in accordance with a desirable battery performance. For example, the organic solvent may include a mixture of ethylene carbonate (EC)/ethylmethyl carbonate (EMC)/dimethyl carbonate (DMC) in a volume ratio of 1 to 4.5/1 to 6.5/1 to 6, specifically, 2.7/3.6/2.7, 3/4/3, 1/4.5/4.5, 1.5/6.5/2, 2/4/4, and the like.

The lithium salt may be selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (LiBOB), and a combination thereof.

In one embodiment, the lithium salt may be used in a concentration of from about 0.5M to about 2.0 M.

According to one embodiment, the flame retardant of the electrolyte may include a compound having flame-retardant characteristics in an electrolyte for a rechargeable battery. In one embodiment, the flame retardant may preferably be at least one selected from a phosphazene compound and a phosphoric acid ester compound. The phosphoric acid ester compound may include trimethyl phosphate, triethylphosphate, tributyl phosphate, triphenyl phosphate, tricresyl phosphate, trixylenyl phosphate, tris(2,2,2-trifluoroethyl) phosphate, tris(2,2-difluoroethyl)phosphate, tris(2-fluoroethyl)phosphate, and the like.

In one embodiment, the flame retardant may be a phosphazene compound represented by the following Chemical Formula 1:

[Chemical Formula 1]

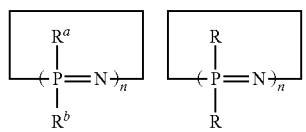

In the above Chemical Formula 1, n is an integer of 3 or 4, and $R^a$ and $R^b$ are the same or different, for example, F, $NR^1_2$, or $OR^1$, wherein $R^1$ is a $C_1$ to $C_{105}$ alkyl group, and in one embodiment, $R^1$ is a $C_1$ to $C_5$ alkyl group.

In one embodiment, the phosphazene compound may be a compound represented by Chemical Formula 2a or Chemical Formula 2b.

[Chemical Formula 2a]

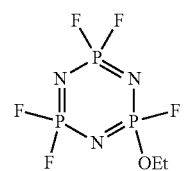

[Chemical Formula 2b]

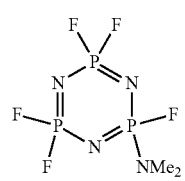

The flame retardant may be included in an appropriate amount depending on a kind thereof and a desired battery characteristic. For example, the phosphazene compound represented by Chemical Formula 2a or Chemical Formula 2b, as the flame retardant may be used in an amount of about 3 vol % to about 15 vol % and specifically, about 3 vol % to about 12 vol % based on the total volume of the electrolyte.

The electrolyte according to one embodiment includes an acrylate compound having a fluorinated alkyl group. In one embodiment, the acrylate compound may be represented by the following Chemical Formula 3:

[Chemical Formula 3]

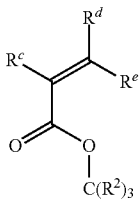

In the above Chemical Formula 3, $R^c$, $R^d$ and $R^e$ are the same or different and are hydrogen or a methyl group, and $R^2$ are the same or different and are independently hydrogen or a $C_1$ to $C_{10}$ fluorinated alkyl group, provided that at least one $R^2$ is a $C_1$ to $C_{10}$ fluorinated alkyl group. Examples of the fluorinated alkyl group may include $-CF_3$, $-(CF_2)_n$ $CHF_2$, $-(CF_2)_nCF_3$ (wherein, n is 1 to 5), $-CF_{2n}C_{2m}H_{2m+1}$ (n and m are 1 to 5), $-(CF_2)_nOC_{2m}F_{2m+1}$ (n and m are 1 to 5), $-(CF_2)_nOCF_2H$ (wherein, n is 1 to 5). In one embodiment, the acrylate compound may be hexafluoroisopropyl acrylate or 2,2,3,3-tetrafluoropropyl acrylate represented by the following Chemical Formulae 4 and 5, respectively:

[Chemical Formula 4]

[Chemical Formula 5]

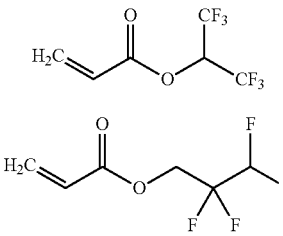

When the acrylate compound is included in the electrolyte, the electrolyte may maintain flame-retardant characteristics without deteriorating cycle-life, increasing resistance, and the like despite addition of the flame retardant. Without being bound to a specific theory, when the acrylate compound is hexafluoroisopropyl acrylate, this compound may prevent cycle-life deterioration of a battery and decrease resistance through the following mechanism when the flame retardant is added thereto:

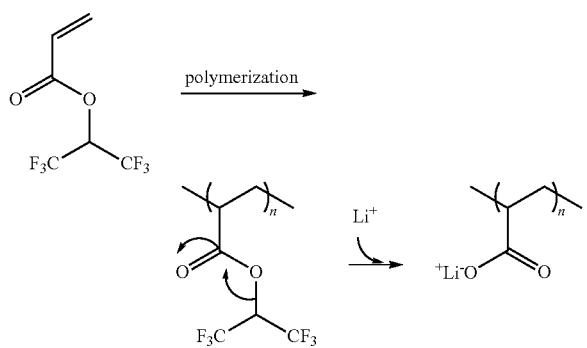

Specifically, the acrylate compound may undergo an ion polymerization reaction in the electrolyte and form a stable film on the surface of an electrode, and a bulky fluorinated alkyl group at the terminal end thereof in the film has high electron density at $-CF_3$ due to fluorine having high electric affinity. Accordingly, $Li^+$ ions are more easily coordinated on the surface of the electrode despite the flame retardant and resultantly, smoothly intercalated and may form the film to have smaller resistance. A carbonyl compound included in the film formed by the acrylate compound may involve the nucleophilic substitution by the lithium ions and thus, have a second reaction in the reaction mechanisms during the charge and discharge. However, since carbon bonded with $CF_3$ has relatively low electron density due to the fluoroalkyl group, electrons relatively slowly move toward oxygen bonded with the carbon. Accordingly, the electrolyte according to one embodiment may not deteriorate battery cycle-life nor decrease resistance despite addition of the flame retardant.

The acrylate compound may be included in an amount appropriate adjusted depending on a kind of the flame retardant and desired battery properties. For example, HC10 or HC10P as the acrylate compound may be included in an amount of about 0.05 wt % to about 5 wt % and specifically, about 0.08 wt % to about 4 wt % based on the total weight of the electrolyte.

In another embodiment, a rechargeable battery including the electrolyte is provided. The rechargeable battery according to one embodiment includes constituent elements such as a positive electrode including a positive active material and a negative electrode including a negative active material, and a separator as well as the electrolyte. The rechargeable lithium battery including the electrolyte is not limited to specific kinds or shapes. For example, the rechargeable lithium battery according to one embodiment includes a lithium ion battery, or a lithium (ion) polymer battery, and may be a cylindrical, prismatic, coin-type, or pouch, or a bulk type or thin film type. Structures and manufacturing methods for lithium ion batteries are well known in the art.

In a rechargeable lithium battery according to one embodiment, a positive electrode including a positive active material may be manufactured according to a well-known method in the related arts, and structures and manufacturing methods thereof are not particularly limited thereto. The positive active material may be a material being reversibly intercalating/deintercalating lithium ions, for example, a lithium transition element compound. More specifically, the positive active material may be at least one composite oxide of a metal selected from cobalt, manganese, nickel, and a combination thereof, and lithium. Examples of the positive active material may be a compound represented by one of the following chemical formulae: $Li_aA_{1-b}R_bD_2$ (0.90≤a≤1.8 and 0≤b≤0.5); $Li_aE_{1-b}R_bO_{2-c}D_c$ (0.90≤a≤1.8, 0≤b≤0.5 and 0≤c≤0.05); $Li_aE_{2-b}R_bO_{4-c}D_c$ (0.90≤a≤1.8, 0≤b≤0.5, 0≤c≤0.05); $Li_aNi_{1-b-c}Co_bR_cD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aNi_bE_cG_dO_2$ (0.90≤a≤1.8, 0≤b≤0.9, 0≤c≤0.5 and 0.001≤d≤0.1.); $Li_aNi_bCo_cMn_dG_eO_2$ (0.90≤a≤1.8, 0≤b≤0.9, 0≤c≤0.5, 0≤d≤0.5 and 0.001≤e≤0.1.); $Li_aNiG_bO_2$ (0.90≤a≤1.8 and 0.001≤b≤0.1.); $Li_aCoG_bO_2$ (0.90≤a≤1.8 and 0.001≤b≤0.1.); $Li_aMnG_bO_2$ (0.90≤a≤1.8 and 0.001≤b≤0.1.); $Li_aMn_2G_bO_4$ (0.90≤a≤1.8 and 0.001≤b≤0.1.); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$; and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In a rechargeable lithium battery according to one embodiment, a negative electrode including a negative active material may be manufactured according to a well-known method in the related arts, and structures and manufacturing methods thereof are not particularly limited thereto. The negative active material includes a material that reversibly intercalates/deintercalates lithium ions, a lithium metal, a lithium metal alloy, a material being capable of doping lithium, or a transition metal oxide.

The material that reversibly intercalates/deintercalates lithium ions includes carbon materials. The carbon material may be any generally-used carbon-based negative active material in a lithium ion secondary battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

The lithium metal alloy may be an alloy of lithium and a metal of Na, K, Rb, Cs, Fr, Be, Mg, Ca, Sr, Si, Sb, Pb, In, Zn, Ba, Ra, Ge, Al, or Sn.

The material being capable of doping and dedoping lithium may include Si, $SiO_x(0<x<2)$, a Si-Q alloy (wherein Q is an alkali metal, an alkaline-earth metal, Group 13 to 16 elements, a transition element, a rare earth element, or a combination thereof, and not Si), Sn, $SnO_2$, a Sn—R alloy (wherein R is an alkali metal, an alkaline-earth metal, Group 13 to 16 elements, a transition element, a rare earth element, or a combination thereof and is not Sn), and the like. At least one of the forgoing materials may be mixed with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may include vanadium oxide, lithium vanadium oxide, and the like.

The positive active material layer and negative active material layer may further include a binder, and a conductive material as needed.

The binder improves binding properties of active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the negative active material.

The conductive material may improve electrical conductivity of a negative electrode. Any electrically conductive material can be used as a conductive agent unless it causes a chemical change. Examples of the conductive material include a carbon-based material of natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene; or a mixture thereof.

The rechargeable lithium battery may further include a separator between a negative electrode and a positive electrode, as needed. The separator may include polyethylene, polypropylene, polyvinylidene fluoride or and multi-layers thereof such as a polyethylene/polypropylene double-layered separator, a polyethylene/polypropylene/polyethylene triple-layered separator, a polypropylene/polyethylene/polypropylene triple-layered separator, and the like.

As described above, a rechargeable lithium battery according to one embodiment including the electrolyte may have a desired type and structure, and such a type and structure, and a manufacturing method is well-known in the art of the rechargeable lithium battery.

FIG. 1 is an exploded perspective view of an example rechargeable lithium battery according to one embodiment. Referring to FIG. 1, a rechargeable lithium battery 100 includes a cylindrical battery that includes a negative electrode 112, a positive electrode 114 and a separator 113 disposed between the negative electrode 112 and positive electrode 114, an electrolyte (not shown) impregnated in the negative electrode 112, positive electrode 114, and separator 113, a battery case 120, and a sealing member 140 sealing the battery case 120. The negative electrode 112, positive electrode 114, and separator 113 are sequentially stacked, spirally wound, and placed in a battery case 120 to fabricate such a lithium secondary battery 100.

The negative and positive electrodes may be fabricated by mixing the active material, a conductive material, and a binder into an active material composition and coating the composition on a current collector. The electrode manufacturing method is well known and thus, is not described in detail in the present specification. The solvent may be N-methylpyrrolidone but it is not limited thereto. In addition, when a water-soluble binder is used for a negative electrode, water as a solvent may be used to prepare a negative active material composition.

The following examples illustrate the present embodiments in more detail. These examples, however, are not in any sense to be interpreted as limiting the scope of this disclosure.

EXAMPLES

Preparation Example 1

An organic solvent was prepared by mixing ethylenecarbonate (EC)/ethylmethylcarbonate (EMC)/dimethylcarbonate (DMC) in a volume ratio of 3/4/3 (v/v/v). Next, 1.3M $LiPF_6$ was added to the organic solvent, 5 vol % of a phosphazene compound represented by the following Chemical formula 2a (hereinafter, referred to be HC10) as a flame retardant was added thereto. Then, 0.1 wt % of hexafluoroisopropyl acrylate as an additive was added to the solution based on the total weight of the electrolyte solution, obtaining a final electrolyte solution.

[Chemical Formula 2a]

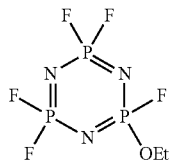

Preparation Example 2

An electrolyte solution was prepared according to the same method as Preparation Example 1 except for using 1 wt % of the hexafluoroisopropyl acrylate as an additive.

Preparation Example 3

An electrolyte solution was prepared according to the same method as Preparation Example 1 except for using 3 wt % of the hexafluoroisopropyl acrylate as an additive.

Preparation Example 4

An electrolyte solution was prepared according to the same method as Preparation Example 1 except for using 0.1 wt % of 2,2,3,3-tetrafluoropropyl acrylate as an additive.

Preparation Example 5

An electrolyte solution was prepared according to the same method as Preparation Example 1 except for using 1 wt % of the 2,2,3,3-tetrafluoropropyl acrylate as an additive.

Preparation Example 6

An electrolyte solution was prepared according to the same method as Preparation Example 1 except for using 3 wt % of the 2,2,3,3-tetrafluoropropyl acrylate as an additive.

Preparation Example 7

An electrolyte solution was prepared according to the same method as Preparation Example 1 except for using 10 vol % of HC10 as a flame retardant.

Preparation Example 8

An electrolyte solution was prepared according to the same method as Preparation Example 1 except for using 10 vol % of HC10 as a flame retardant and 1 wt % of the hexafluoroisopropyl acrylate as an additive.

Preparation Example 9

An electrolyte solution was prepared according to the same method as Preparation Example 1 except for using 10 vol % of HC10 as a flame retardant and 3 wt % of the hexafluoroisopropyl acrylate as an additive.

Preparation Example 10

An electrolyte solution was prepared according to the same method as Preparation Example 1 except for using 10 vol % of HC10 as a flame retardant and 0.1 wt % of the 2,2,3,3-tetrafluoropropyl acrylate as an additive.

Preparation Example 11

An electrolyte solution was prepared according to the same method as Preparation Example 1 except for using 10 vol % of HC10 as a flame retardant and 1 wt % of the 2,2,3,3-tetrafluoropropyl acrylate as an additive.

Preparation Example 12

An electrolyte solution was prepared according to the same method as Preparation Example 1 except for using 10 vol % of HC10 as a flame retardant and 1 wt % of the 2,2,3,3-tetrafluoropropyl acrylate as an additive.

Examples 1 to 12

Manufacture of Lithium Battery Cell

The following positive and negative electrodes and a separator were used to fabricate a coin-type lithium cells.

Positive electrode: A $Li(Ni_{0.5}Co_{0.2}Mn_{0.3})O_2$ (NCM) positive active material, a polyvinylidene fluoride binder, and a denkablack conductive material in a ratio of 92:4:4 wt % were mixed in an N-methylpyrrolidone solvent, preparing positive active material slurry. The positive active material slurry was coated on an Al current collector, dried, and compressed, fabricating a positive electrode.

Negative electrode: An artificial graphite negative active material and a carboxy metayl cellulose/styrene-butadiene rubber binder were mixed in a $H_2O$ solvent in a ratio of 97.5:1:1.5 wt %, preparing negative active material slurry. The negative active material slurry was coated on a Cu current collector and then, dried and compressed, fabricating a negative electrode.

Separator: Celgard 2320 (polypropylene/polyethylene/polypropylene triple layer, thickness: 20 μm).

The positive and negative electrodes and the separator were used to fabricate a 2016 type coin cell (a 15 mm disk-shaped positive electrode and a 16 mm disk-shaped negative electrode), and the electrolyte solutions according to Preparation Examples 1 to 12 were respectively injected therein, fabricating a lithium ion battery cell.

Comparative Example 1

An organic solvent was prepared by mixing ethylene carbonate (EC)/ethylmethylcarbonate (EMC)/dimethyl carbonate (DMC) in a volume ratio of 3/4/3 (v/v/v). Then, a lithium ion battery cell was fabricated according to the same method as Example 1 except for preparing an electrolyte solution by adding 1.3M $LiPF_6$ to the organic solvent.

Experimental Example

Discharge C-Rate Characteristics and Cycle-Life Characteristics of Battery Cells The lithium ion battery cells according to Examples 2, 7, and 10 and Comparative Example 1 were evaluated regarding discharge C-rate characteristic. The test was performed by charging and discharging the lithium ion battery cells at each C rate for once. The results are provided in Table 1.

TABLE 1

| | Discharge Capacity (mAh/g) | | | |
|---|---|---|---|---|
| Discharge C-rate | Comparative Example 1 | Example 2 | Example 7 | Example 10 |
| 0.5 C | 152.9 | 155.3 | 152.5 | 154.0 |
| 1 C | 139.6 | 145.4 | 142.9 | 144.2 |
| 2 C | 131.9 | 138.6 | 136.2 | 136.9 |

Referring to Table 2, the lithium ion battery cells according to Examples 2, 7, and 10 had improved high rate discharge characteristic compared with the one Comparative Example 1.

The lithium ion battery cells according to Examples 1, 3, 4, 6 to 8, and 11 to 12 and Comparative Example 1 were measured regarding cycle-life characteristic under the following condition.

The lithium ion battery cells were charged and discharged at 0.5 C with 4.2V of a charge potential (0.02 C of a current cut-off) and 2.8V of a discharge potential in the first cycle, at 0.5 C with 4.2V of a charge potential (0.05 C of a current cut-off) and 2.8V of a discharge potential in the second cycle, at 1 C with 4.2V of a charge potential (0.05 C of a current cut-off) and 2.8V of a discharge potential in the third cycle, and at 2 C with 4.2V of a charge potential (0.05 C of a current cut-off) and 2.8V of a discharge potential in the fourth cycle and then, at 1 C with 4.2V of a charge potential (0.05 C of a current cut-off) and 2.8V of a discharge potential up to 60 cycles.

The lithium ion battery cells were measured regarding charge and discharge retention at the 30th cycle. The discharge retention was obtained from percentages of the discharge capacity after 60 cycles to the discharge capacity after the fourth cycle. The results are provided in the following Table 2:

TABLE 2

| | Discharge Retention |
|---|---|
| Comparative Example 1 | 98% |
| Example 1 | 99% |
| Example 3 | 100% |
| Example 4 | 99% |
| Example 6 | 99% |
| Example 7 | 100% |
| Example 8 | 99.2% |
| Example 11 | 99.5% |
| Example 12 | 98.8% |

Referring to Table 1, the lithium ion battery cells according to Examples 1, 3, 4, 6, 7 to 11 had a high charge/discharge retention of greater than or equal to 99%, which is higher than that of the one according to Comparative Example 1.

The lithium ion battery cells according to Examples 1, 3, 4, 6, 7, and 11 Comparative Example 1 had the following charge and discharge retention at the 55th cycle as shown in Table 3:

TABLE 3

| | Discharge Retention |
|---|---|
| Comparative Example 1 | 97% |
| Example 1 | 98% |
| Example 3 | 99% |

TABLE 3-continued

| | Discharge Retention |
|---|---|
| Example 4 | 100% |
| Example 6 | 97.2 |
| Example 7 | 100% |
| Example 11 | 97.5% |

Based on the results, the lithium ion battery cells according to the Examples were remarkably suppressed from cycle-life characteristic deterioration compared with the one according to Comparative Example.

While the present embodiments has been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising
an organic solvent; a lithium salt; a flame retardant; and a compound having a fluorinated alkyl group selected from hexafluoroisopropyl acrylate, 2,2,3,3-tetrafluoropropyl acrylate, and a mixture thereof,
wherein the flame retardant is included in an amount of about 3 vol % to about 15 vol % based on the total volume of the electrolyte,
wherein the compound having a fluorinated alkyl group is included in an amount of about 0.05 wt % to about 5 wt % based on the total weight of the electrolyte.

2. The electrolyte for a rechargeable lithium battery of claim 1, wherein the compound having a fluorinated alkyl group is hexafluoroisopropyl acrylate.

3. The electrolyte for a rechargeable lithium battery of claim 1, wherein the flame retardant is at least one phosphazene-based compound represented by the following Chemical Formula 1:

[Chemical Formula 1]

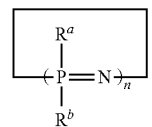

wherein, n is an integer of 3 or 4, and $R^a$ and $R^b$ are the same or different, and are F, $NR^1_2$, or $OR^1$, wherein $R^1$ is a $C_1$ to $C_{10}$ alkyl group.

4. The electrolyte for a rechargeable lithium battery of claim 3, wherein the phosphazene-based compound is a compound represented by Chemical Formula 2a or Chemical Formula 2b:

[Chemical Formula 2a]

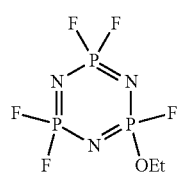

[Chemical Formula 2b]

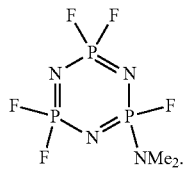

5. The electrolyte for a rechargeable lithium battery of claim 1, wherein the compound having a fluorinated alkyl group is 2,2,3,3-tetrafluoropropyl acrylate.

6. The electrolyte for a rechargeable lithium battery of claim 5, wherein the compound having a fluorinated alkyl group is a mixture of hexafluoroisopropyl acrylate, and 2,2,3,3-tetrafluoropropyl acrylate.

7. The electrolyte for a rechargeable lithium battery of claim 1, wherein the lithium salt is at least one selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (LiBOB), and a combination thereof.

8. The electrolyte for a rechargeable lithium battery of claim 1, wherein the organic solvent is at least one selected from carbonate, ester, ether, ketone, alcohol, an aprotic solvent, and a combination thereof.

9. A rechargeable lithium battery, comprising
a positive electrode including a positive active material;
a negative electrode including a negative active material; and
an electrolyte comprising an organic solvent; a lithium salt; a flame retardant; and
a compound having a fluorinated alkyl group selected from hexafluoroisopropyl acrylate, 2,2,3,3-tetrafluoropropyl acrylate, and a mixture thereof,
wherein the flame retardant is included in an amount of about 3 vol % to about 15 vol % based on the total volume of the electrolyte,
wherein the compound having a fluorinated alkyl group is included in an amount of about 0.05 wt % to about 5 wt % based on the total weight of the electrolyte.

10. The rechargeable battery of claim 9, wherein the compound having a fluorinated alkyl group is hexafluoroisopropyl acrylate.

11. The rechargeable battery of claim 9, wherein the flame retardant is at least one phosphazene-based compound represented by the following Chemical Formula 1:

[Chemical Formula 1]

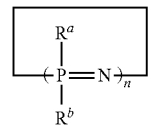

wherein, n is an integer of 3 or 4, and $R^a$ and $R^b$ are the same or different, and are F, $NR^1_2$, or $OR^1$, wherein $R^1$ is a $C_1$ to $C_{10}$ alkyl group.

12. The rechargeable battery of claim 11, wherein the phosphazene-based compound is a compound represented by Chemical Formula 2a or Chemical Formula 2b:

[Chemical Formula 2a]

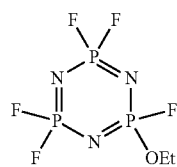

[Chemical Formula 2b]

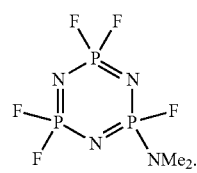

13. The rechargeable battery of claim 12, wherein the compound having a fluorinated alkyl group is a mixture of hexafluoroisopropyl acrylate, and 2,2,3,3-tetrafluoropropyl acrylate.

14. The rechargeable battery of claim 9, wherein the compound having a fluorinated alkyl group is 2,2,3,3-tetrafluoropropyl acrylate.

15. The rechargeable battery of claim 9, wherein
the lithium salt is at least one selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x-1}SO_2)(C_yF_{2y+1}SO_2)$ (wherein, x and y are natural numbers), LiCl, LiI, $LiB(C_2O_4)_2$ (LiBOB), and a combination thereof.

16. The rechargeable battery of claim 9, wherein the organic solvent is at least one selected from carbonate, ester, ether, ketone, alcohol, an aprotic solvent, and a combination thereof.

* * * * *